US008754378B2

(12) United States Patent
Prescher et al.

(10) Patent No.: US 8,754,378 B2

(45) Date of Patent: Jun. 17, 2014

(54) SILICON PHOTOMULTIPLIER READOUT CIRCUITRY

(75) Inventors: Gordian Prescher, Cologne (DE); Thomas Frach, Aachen (DE)

(73) Assignee: Koninklijke Philips N.V., Eindhoven (NL)

(*) Notice: Subject to any disclaimer, the term of this patent is extended or adjusted under 35 U.S.C. 154(b) by 467 days.

(21) Appl. No.: 12/672,072

(22) PCT Filed: Aug. 6, 2008

(86) PCT No.: PCT/IB2008/053162

§ 371 (c)(1), (2), (4) Date: Feb. 4, 2010

(87) PCT Pub. No.: WO2009/019659

PCT Pub. Date: Feb. 12, 2009

(65) Prior Publication Data

US 2011/0079727 A1 Apr. 7, 2011

Related U.S. Application Data

(60) Provisional application No. 60/954,626, filed on Aug. 8, 2007.

(51) Int. Cl.

| | |
|---|---|
| ***H01L 25/00*** | (2006.01) |
| ***G01T 1/24*** | (2006.01) |
| ***H03K 17/78*** | (2006.01) |
| ***G01T 1/29*** | (2006.01) |

(52) U.S. Cl.

CPC ............... *G01T 1/248* (2013.01); *G01T 1/2928* (2013.01)

USPC ............. 250/370.1; 250/370.14; 250/214 DC

(58) Field of Classification Search

USPC ........................... 250/370.1, 370.14, 214 DC

See application file for complete search history.

(56) References Cited

U.S. PATENT DOCUMENTS 5,401,952 A * 3/1995 Sugawa ..................... 250/208.1
5,668,484 A 9/1997 Nomura (Continued)

FOREIGN PATENT DOCUMENTS

| | | |
|---|---|---|
| WO | 2004099865 A2 | 11/2004 |
| WO | 2006111869 A2 | 10/2006 |
| WO | 2006111883 A2 | 10/2006 |
| WO | 2006126026 A1 | 11/2006 |
| WO | 2009001237 A1 | 12/2008 |
| WO | 2009019660 A2 | 2/2009 |

OTHER PUBLICATIONS

Cova, et al.; Evolution and Prospect of Single-Photon Avalanche Diodes and Quenching Circuits; 2003; Workshop on Single Photon Detectors presentation, Polimi-Politecnico de Malano, DEI; 36 pages.

(Continued)

*Primary Examiner* — David Porta
*Assistant Examiner* — Kenneth J Malkowski

(57) ABSTRACT

A photon-counting Geiger-mode avalanche photodiode intensity imaging array includes an array of pixels (200), each having an avalanche photodiode (250). A pixel senses an avalanche event and stores, in response to the sensed avalanche event, a single bit digital value therein. An array of accumulators (320) are provided such that each accumulator is associated with a pixel. A row decoder circuit (310) addresses a pixel row within the array of pixels. A bit sensing circuit (300) converts a precharged capacitance into a digital value during read operations.

23 Claims, 6 Drawing Sheets

(56) References Cited

U.S. PATENT DOCUMENTS

| | | | | |
|---|---|---|---|---|
| 6,356,116 | B1 | 3/2002 | Oh | |
| 7,115,963 | B2 | 10/2006 | Augusto et al. | |
| 2002/0148957 | A1 | 10/2002 | Lingren et al. | |
| 2003/0213915 | A1* | 11/2003 | Chao et al. | 250/370.14 |
| 2005/0012033 | A1* | 1/2005 | Stern et al. | 250/214 R |
| 2006/0192086 | A1 | 8/2006 | Niclass et al. | |
| 2006/0202129 | A1 | 9/2006 | Niclass et al. | |
| 2006/0231742 | A1 | 10/2006 | Forsyth | |
| 2007/0126060 | A1 | 6/2007 | Lee et al. | |

OTHER PUBLICATIONS

Niclass, et al.; A Single Photon Detector Array with 64x64 Resolution and Millimetric Depth Accuracy for 3D Imaging; 2005; IEEE Solid-State Circuits Conf.; Session 19-Imagers; pp. 364, 365, 604.

McElroy, et al.; Characterization and Readout of MADPET-II Detector Modules: Validation of a Unique Design Concept for High Resolution Small Animal PET; 2005; IEEE Trans. on Nuclear Science; 52(1)199-204.

* cited by examiner 502
208
$-V_{BIAS}$
508
504
506
516
518
510
bEN
bRE
bRE
bEN
512
514
520
522
524
EN
T
D
OE
530
526
528

602
208
$-V_{BIAS}$
508
504
506
516
518
510
bEN
bRE
bRE
bEN
604
bEN
606
EN
512
514
520
522
T
D
OE
530
526

530
526
522
520
704
512
514
706
508
504
506
516
518
510
702
208
O
T
OE
EN
bEN
bRE
RE
$-V_{BIAS}$
$+V_{BIAS}$

SILICON PHOTOMULTIPLIER READOUT CIRCUITRY

CROSS REFERENCE TO RELATED APPLICATIONS

This application claims the benefit of U.S. provisional application Ser. No. 60/954,626 filed Aug. 8, 2007, which is incorporated herein by reference.

The following relates to photodiodes, and especially to arrays of Geiger-mode avalanche photodiodes. It finds particular application to detectors used in positron emission tomography (PET) and single photon emission computed tomography (SPECT) systems, optical imaging devices, and other applications in which arrays of photosensors are deployed.

Various applications in the medical and other domains rely on the detection of low level light pulses. PET systems, for example, include radiation sensitive detectors that detect temporally coincident 511 kilo electron volt (keV) gamma photons indicative of positron decays occurring in an examination region. The detectors include a scintillator that generates bursts of lower energy photons (typically in or near the visible light range) in response to received 511 keV gammas, with each burst typically including on the order of several hundreds to thousands of photons spread over a time period on the order of a few tens to hundreds of nanoseconds (ns). In the case of time of flight (TOF) PET systems, the relative arrival times of the gamma photons have been used to estimate a position of the positron decay along a line of response (LOR).

Photomultiplier tubes (PMTs) have conventionally been used to detect the photons produced by the scintillator. However, PMTs are relatively bulky, vacuum tube based devices that are not especially well-suited to applications requiring high spatial resolution. More recently, silicon photomultipliers (SiPMs) have been introduced. SiPMs have included an array of detector pixels, with each pixel including on the order of several thousand avalanche photodiode (APD) cells connected electrically in parallel. The various APD cells are operated in the Geiger mode, with each cell including quenching circuit. SiPMs can offer a number of advantages, including relatively compact size, good sensitivity, and good spatial resolution. Moreover, APDs and their associated readout circuitry can often be fabricated on a common semiconductor substrate.

A digital SiPM that includes digital readout circuitry implemented at the cell level is disclosed in PCT publication WO 2006/111883A2 dated Oct. 26, 2006 and entitled Digital Silicon Photomultiplier for TOF-PET. As disclosed more fully in the publication, the described structure can be exploited to provide a particularly effective digital readout scheme. However, implementing the readout circuitry at the cell level tends to increase the percentage of the cell area that is devoted to the readout circuitry. Stated conversely, the arrangement tends to reduce the area available for the photodiode and hence the area efficiency of the array. Moreover, system performance can often be enhanced by improving the accuracy of the system timing measurements.

Aspects of the present application address these matters and others.

According to a first aspect, an apparatus includes a first photodetector cell and a second photodetector cell. The first photodetector cell includes a first avalanche photodiode and first circuit. The first circuit senses an avalanche of the first photodiode and stores a first 1-bit digital value indicative of the sensed avalanche. The second photodetector cell includes a second avalanche photodiode and a second circuit. The second circuit senses an avalanche of the second photodiode and stores a second 1-bit digital value indicative of the sensed avalanche.

According to another aspect, a method includes, in a plurality of photodetector cells of a photodetector pixel, determining if an avalanche photodiode of the cell produces a signal indicative of an avalanche, storing a result of the determination as a 1-bit digital value in a circuit of the cell, and counting the stored digital values to produce a value indicative of the number of avalanches.

According to another aspect, a photodetector apparatus includes a plurality of photodiode cells. The cells include an avalanche photodiode and a readout circuit. The readout circuits include a first output that presents an asynchronous 1-bit digital photodiode avalanche signal and a second output that presents a synchronous 1-bit digital photodiode avalanche signal. The apparatus also includes a counter that counts the presented synchronous signals and a time to digital converter including a trigger input in operative electrical communication with a second output.

According to another aspect, a photodetector includes a semiconductor substrate, a plurality of photodetector cells fabricated on the substrate. The cells include an avalanche photodiode (208) and a six transistor SRAM cell.

According to another aspect, a photodetector includes an avalanche photodiode, a latching photon trigger circuit (308), a photon trigger output (212), and a photon data output (214).

According to another aspect, a photodetector includes a semiconductor substrate, a first photosensor fabricated on the substrate, and a first photosensor readout circuit fabricated on the substrate. The first readout circuit includes a first output enable input, a first open drain digital output circuit that is selectively enabled via the first output enable input, and a second open drain digital output circuit. The photodetector also includes a second photosensor fabricated on the substrate and a second photosensor readout circuit fabricated on the substrate. The second readout circuit includes a second output enable input, a third open drain digital output circuit that is selectively enabled via the second output enable input, and a fourth open drain digital output circuit.

Still further aspects of the present invention will be appreciated to those of ordinary skill in the art upon reading and understand the following detailed description.

The invention may take form in various components and arrangements of components, and in various steps and arrangements of steps. The drawings are only for purposes of illustrating the preferred embodiments and are not to be construed as limiting the invention.

FIGS. 5, 6, 7, and 8 depict cell readout circuits.

Figure 9:
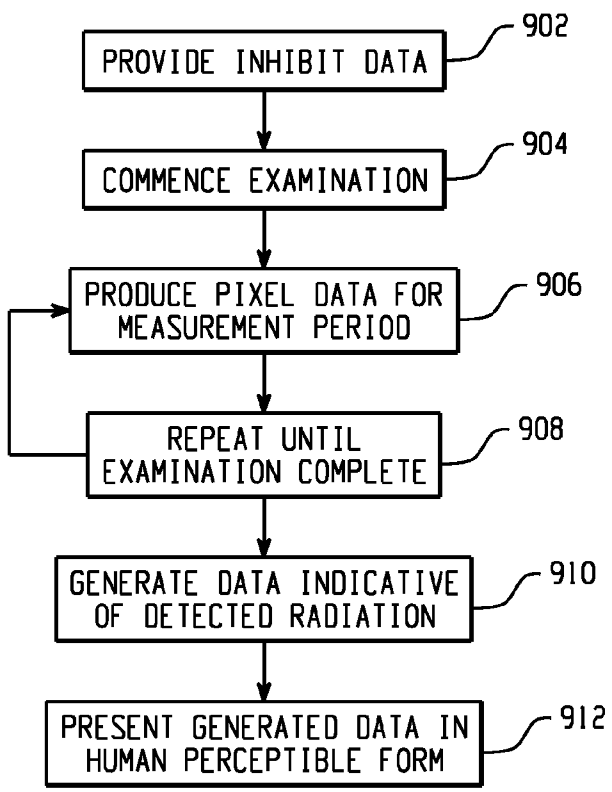

FIG. 9 depicts a method.

Figure 1:
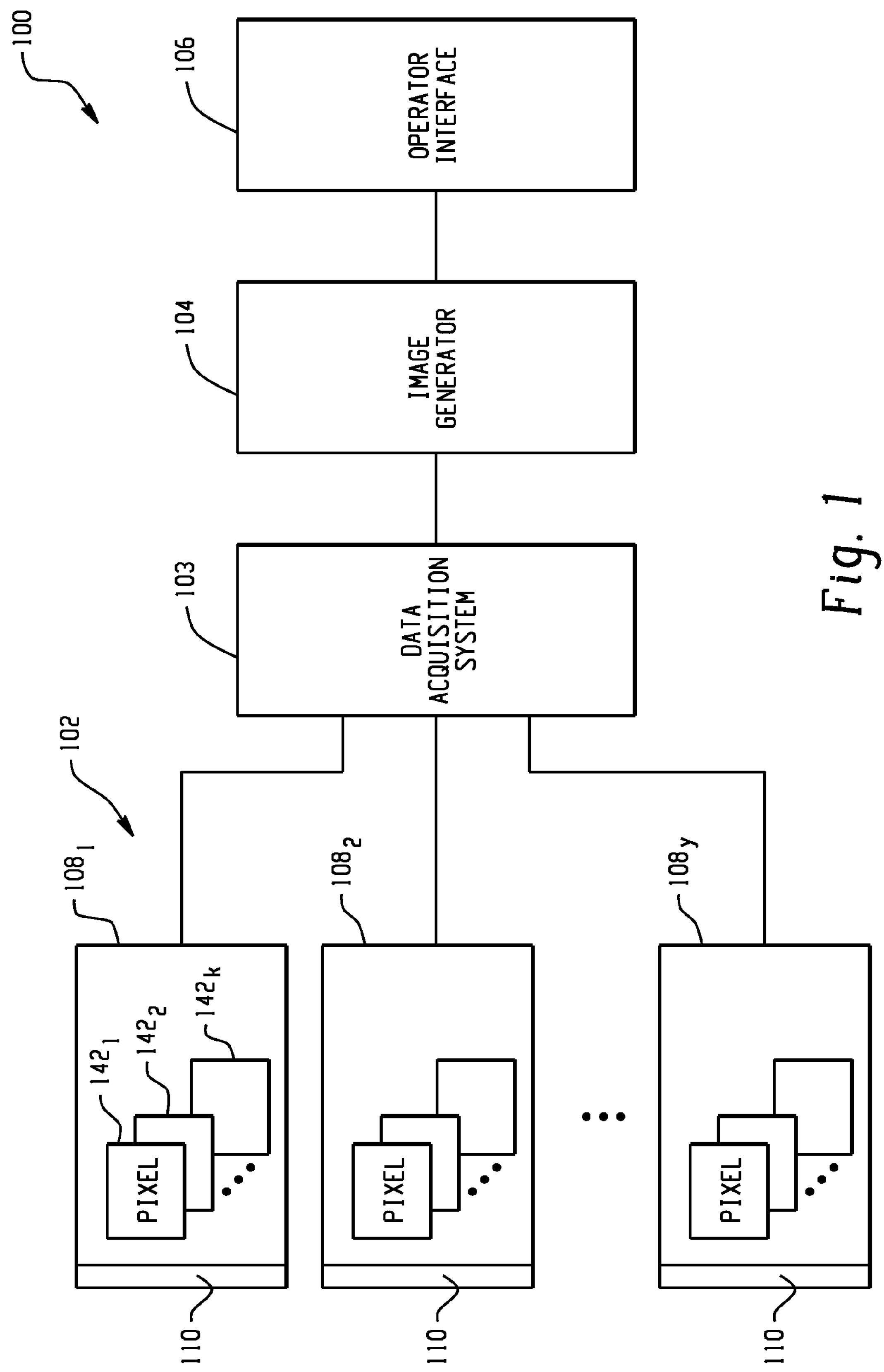
FIG. 1 depicts an imaging system.

With reference to FIG. 1, an example imaging system 100 includes one or more radiation sensitive detectors 102, a data acquisition system 103, an image generator 104, and an operator interface 106.

The radiation sensitive detector 102 includes one or more SiPMs $\mathbf{108}_{1\text{-}y}$. As will be described in further detail below, the SiPMs 108 include one or more detector pixels $\mathbf{142}_{1\text{-}k}$ that produce output data indicative of the energy, arrival times, locations, and/or other characteristics of the radiation detected by the SiPM. Wavelength shifters 110 such as scintillators may be provided to shift the wavelength(s) of the incoming radiation to more closely match the sensitive wavelength(s) of the SiPMs 108. In the example case of a PET system, the SiPMs 108 are disposed about an examination region in a generally annular or ring-shaped arrangement.

Signals from the detector 102 are received by a data acquisition system 103, which produces data indicative of the detected radiation. Again in the example case of a PET system, the data acquisition system 103 produces projection data indicative of temporally coincident photons received by the various SiPMs. Where the system includes time of flight capabilities, a time of flight determiner uses relative arrival times of coincident 511 KeV gamma received by the various SiPMs 208 so as to produce time of flight data.

An image generator 104 uses the data from the acquisition system 103 to produce image(s) or other data indicative of the detected radiation. Again in the example of a PET system, the image generator 104 includes an iterative or other reconstructor that reconstructs the projection data to form volumetric or image space data.

The user interacts with the system 100 via the operator interface 106, for example to control the operation of the system 100, view or otherwise manipulate the data from the image generator 104, or the like.

It will be understood that variations on the imaging system 100 are contemplated. In one such variation, the system 100 also includes a second modality imaging system. Again to the example of a PET system, the second modality system may include an x-ray computed tomography (CT), magnetic resonance (MR), x-ray, or other system. According to such an implementation, the examination regions of the first and second modality systems are ordinarily located in physical proximity so as to reduce or otherwise obviate the need for repositioning the patient or other object being examined.

Moreover, the SiPMs 108 may be employed in systems other than PET systems. Non-limiting examples include SPECT systems, fluorescence and optical imaging systems, high energy physics, and other medical and non-medical systems. Where the objective is to detect light radiation or other radiation having a wavelength which falls within the sensitive wavelength of the photodiodes, the scintillator 110 may also be omitted.

Figure 2A:
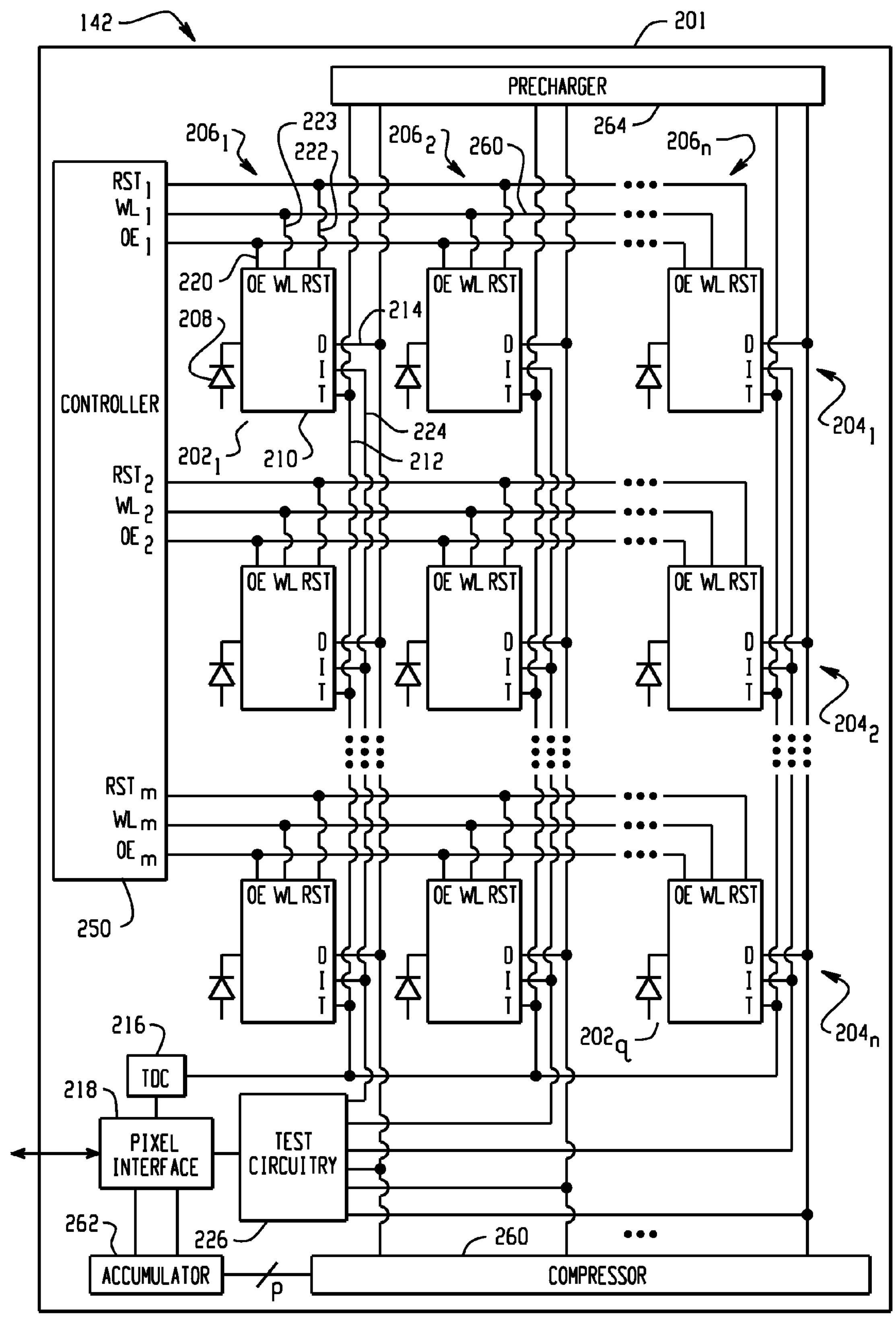
FIG. 2A depicts a detector pixel.

An example pixel 142 will now be further described with reference to FIG. 2A. As illustrated, the pixel 142 includes a plurality of detector cells $\mathbf{202}_{1-q}$ fabricated on a semiconductor substrate 201. The cells 202 are organized in a regular or other array that includes a plurality of rows $\mathbf{204}_{1-m}$ and/or columns $\mathbf{206}_{1-n}$. Each cell 202 includes an APD 208 biased to operate in the Geiger mode, together with a cell readout circuit 210.

The cell readout circuit 210 includes a photon trigger output 212 and a photon data output 214. The trigger output 212 presents an asynchronous 1-bit digital photodiode avalanche signal. In the case of a PET or other system that measures the photon arrival times, the various trigger outputs 212 are operatively connected to a time to digital converter (TDC) 216 that generates digital timestamp data indicative of the photon arrival time, for example with respect to a common scanner or system clock. Note that a validation circuit may also be provided to accept those trigger signals that are likely the result of detected photons or, stated conversely, to reject those signals that are likely the result of photodiode dark counts or other spurious signals. One suitable trigger line architecture is described in U.S. patent application Ser. No. 60/954,623 filed on Aug. 8, 2007 and entitled Silicon Photomultiplier Trigger Network, which application is expressly incorporated by reference herein in its entirety. The data output 214 presents a synchronous 1-bit digital photodiode avalanche signal.

The cell readout circuit 210 also includes an output enable (or viewed conversely, an output disable) input 220, a reset input 222, an inhibit status storage enable (or viewed conversely, an inhibit status storage disable) input 223, and an inhibit input 224. The output enable input 220 enables the data output 214 in connection with the readout of the cell 202. The reset input 222 receives a signal that resets the cell 202 at the conclusion of a measurement period or otherwise. The inhibit input 224, which receives the inhibit signal that inhibits or disables an operation of the cell 210, is enabled by the inhibit enable input 223.

A controller or row decoder 250 is operatively connected to the data acquisition system 120. As illustrated, the controller 250 includes reset, inhibit enable, and output enable outputs corresponding to the various rows 204 of the array. The outputs are connected to the corresponding inputs of the cells 210 in each row 204. The data outputs 214 and inhibit inputs 224 of the various cells are connected in a columnar fashion. Hence, the various cells 202 are ordinarily enabled or reset on a row-by-row basis with data being read out from or written to the cells 202 on a column-by-column basis.

Where the various trigger 212 and data 214 outputs of the various cells 202 are connected in a wired-NOR arrangement, suitable pre-charger circuitry 264 may be provided to maintain the various trigger and data lines in a high or otherwise inactive state.

The pixel readout circuit 142 also includes test circuitry 226. When the pixel is operated in a test mode, the test circuitry 226 tests one or more characteristic(s) of the cells 202 in the array and generates an output signal(s) indicative of a result of the test(s). In one implementation, the test circuitry 226 tests the dark count rates of the various cells 202 and produces an inhibit output signal for those cells 202 having a dark count rate that exceeds a desired value. Also as illustrated, the test circuitry 226 is organized on a columnar fashion so that a cell 202 from each of the columns 206 can ordinarily be tested concurrently. An example implementation of the test circuitry 226 is described more fully in U.S. patent application Ser. No. 60/945,998, filed on Jun. 25, 2007 and entitled Photodiode Self-Test, which application is expressly incorporated by reference in its entirety herein.

The cell data outputs 214 are processed by a compressor 260 and an accumulator 262, which cooperate to count the number of photons and hence provide an output indicative of the energy of the radiation detected by the pixel 142 during a given measurement period. The compressor 260 receives data outputs 214 of the cells in each column 206 on a row-by-row basis and produces a p-bit output indicative of the number of cells 202 in the row that have detected a photon during a measurement period. Where the array includes thirty two (32) columns 206, for example, the compressor may include thirty two (32) inputs and produce a six (6) bit output. The accumulator 262 accumulates or sums the compressed data from each of the rows to produce an output indicative of the total number of cells 202 that have detected a photon during the measurement period. Note that implementation of some or all of the counting functionality at the SiPM or pixel level tends to reduce the size of the cell 202 circuitry relative to implementations in which the counting functionality is implemented at the cell 202 level, thus also tending to improve the area efficiency of the array.

The pixel interface 218 provides suitable interface with the data acquisition system 103 or other desired portion(s) of the system 100.

Figure 2B:
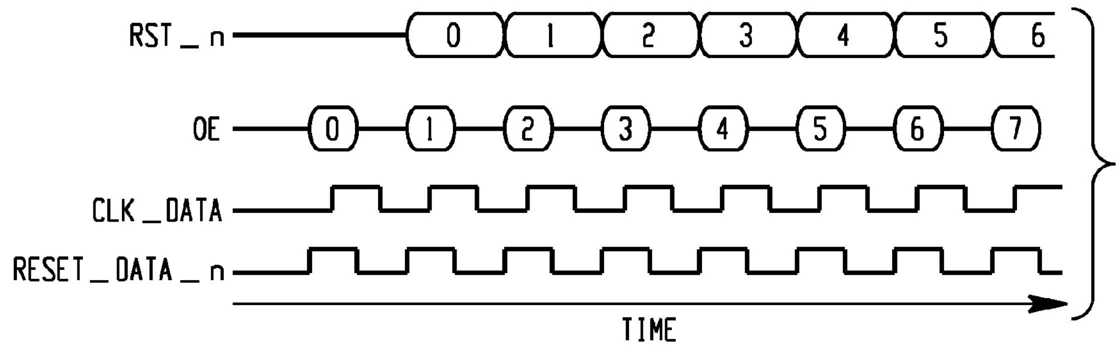
FIG. 2B depicts a readout sequence.

A suitable cell 202 readout sequence will now be described with reference to FIG. 2B, it being understood that the data lines 214 are pre-charged to a logic high or otherwise inactive state. During the readout sequence, the various output enable lines are activated in a desired sequence, for example from the top to bottom of the array or vice versa. The traces RST_n and OE indicate the row number that is being reset or whose output is enabled, respectively (note that _n indicates an active low signal). The CLK_DATA trace indicates the latching of the values from the data outputs 214 of the enabled row 204 to the compressor 260—accumulator 262 circuit, and the RESET_DATA_n trace indicates the charging of the data lines.

Figure 3:
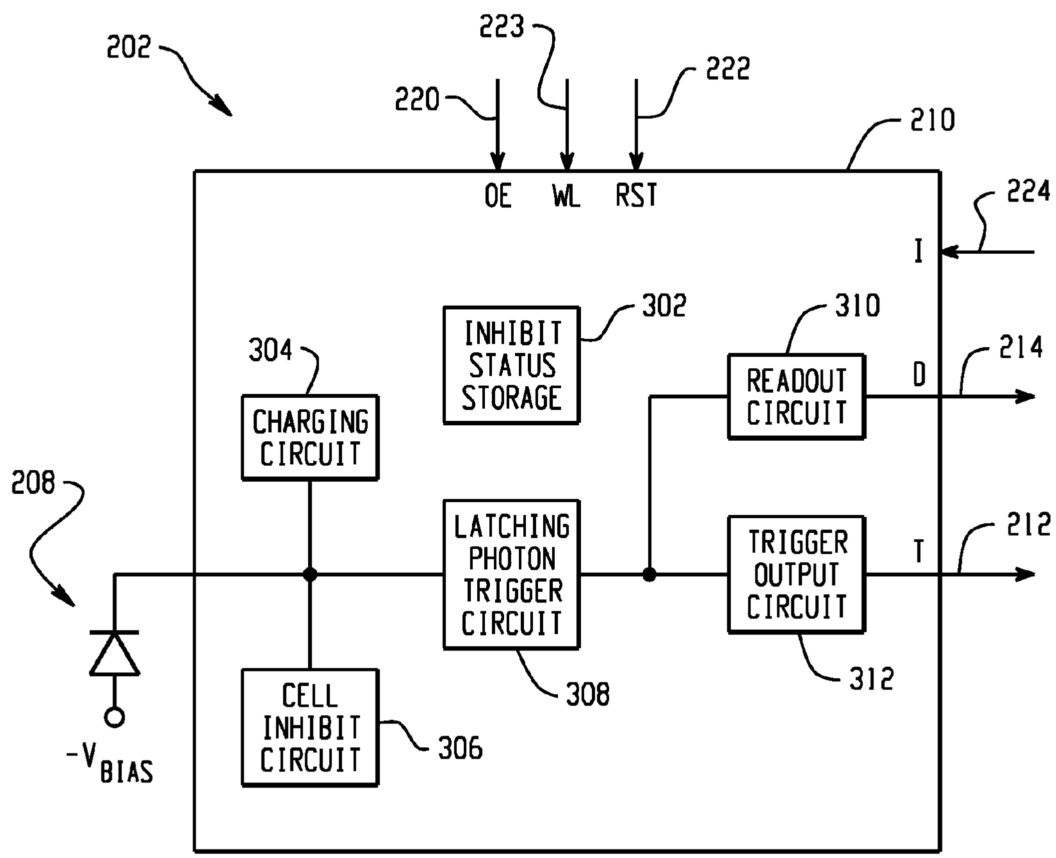
FIG. 3 depicts a readout circuit.
Figure 4:
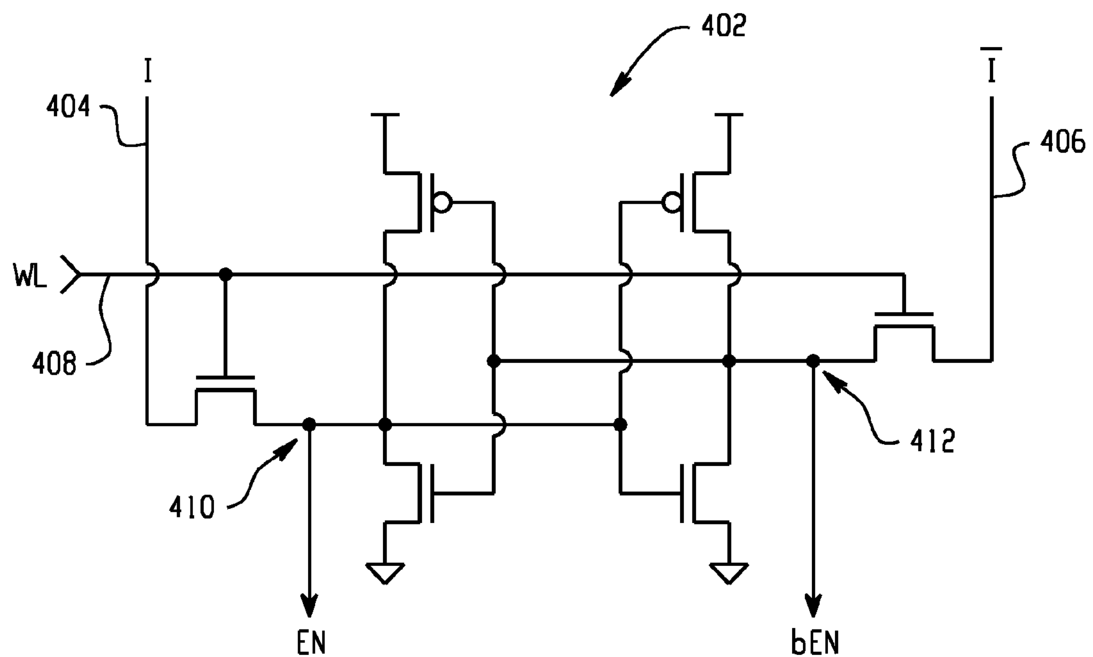
FIG. 4 depicts a six transistor static random access memory (SRAM) cell.

Turning now to FIG. 3, an example readout circuit 210 will now be described. Note that, as will be understood by those of ordinary skill in the art, connections between certain items in FIG. 3 have been omitted for clarity of explanation. As illustrated, the readout circuit includes inhibit status storage circuit 302 that operates in coordination with the inhibit enable input 223 to store a digital signal received via the inhibit input 224. Turning briefly to FIG. 4, the inhibit status storage circuit may be implemented via a standard six (6) transistor static random access memory (SRAM) cell 402. The SRAM cell 402 includes complementary positive 404 and negative 406 data inputs that receive the inhibit signal from the test circuitry 226. Note that, to reduce the transistor count at the cell 202 level, the test circuitry 226 is preferably configured to provide complementary positive and negative logic output signals. The signals are stored at positive 410 and negative 412 logic nodes of the cell 402, which provide complementary active high (EN) and active low (bEN) cell enable signals.

While other implementations of the inhibit status storage 302 are contemplated, one advantage of the illustrated SRAM cell 402 is the relative compactness of the required circuitry, which in turn tends to improve the area efficiency of the array. Where, as noted above, a typical pixel may include on the order of 1,000 or more cells 202, such compactness can be particularly significant. Moreover, the SRAM cell 402 provides both positive and negative logic output signals which can be utilized by the cell readout circuit 210 as will be described in further detail below.

Returning to FIG. 3, a cell inhibit circuit 306 inhibits an operation of the cell 202 based on the inhibit status stored by the storage 302, and a charging circuit 304 charges the photodiode 208 in response to a signal received via the reset input 222. Note that the charging voltage applied to the photodiode may be greater than or otherwise different from the power supply voltage provided to other portions of the cell 202. Recharging of the photodiode is preferably disabled when the cell 202 is inhibited.

A latching photon trigger circuit 308 senses an avalanche of the photodiode 208 and produces a photon trigger signal indicative of the sensed avalanche. The signal is stored as a 1-bit digital value until the circuit 308 is reset via the reset input 222.

The trigger signal from the latching trigger circuit 308 is received by a trigger output circuit 312, which produces the cell trigger output signal 212. The trigger signals are also received by a selective readout circuit 310. The selective readout circuit 310, which is enabled via the output enable input 220, produces the cell data output signal 214, thus indicating whether an avalanche of the photodiode 208 was detected since the last reset. Note that one or both of the trigger output circuit 312 and the readout circuit 310 may be disabled when the cell 202 is inhibited.

Figure 5:
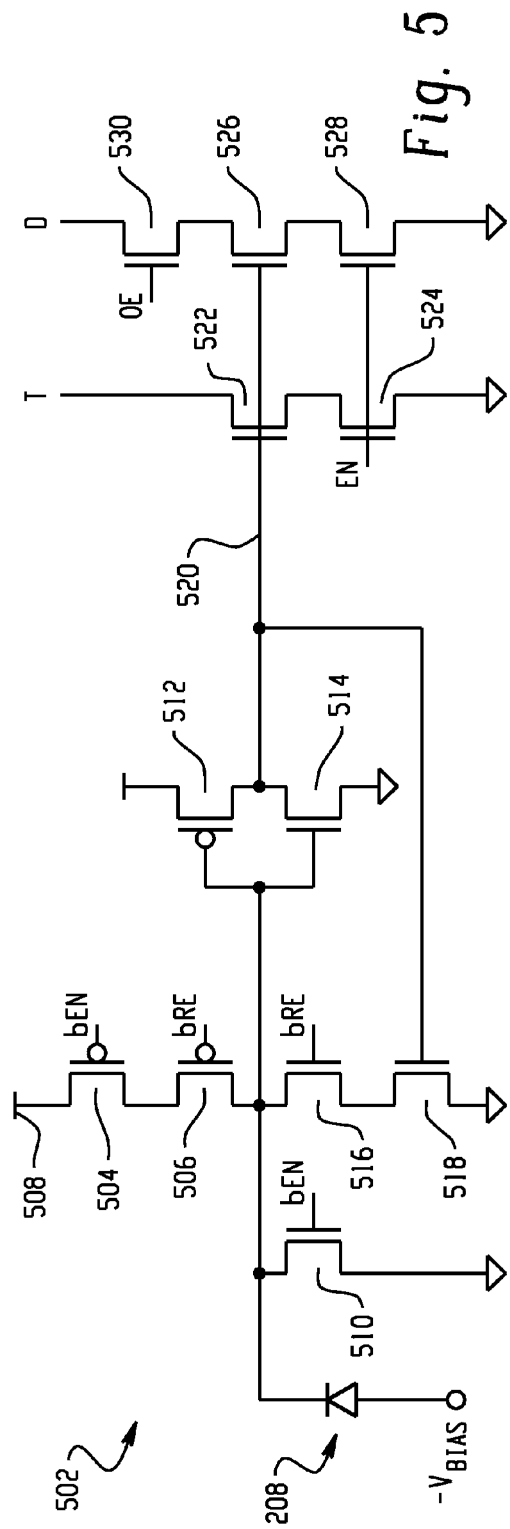

Turning now to FIG. 5, a first embodiment 502 of the cell readout circuit will be described in greater detail. As illustrated, active recharging of the photodiode 208 is provided via p-channel field effect transistors (PFETs) 504, 506 that are connected electrically in series between the pull-up voltage source 508 and the cathode of the photodiode 208. The gate of PFET 504 receives the bEN signal from the cell inhibit storage 302, while the gate of the PFET 506 receives an active low reset signal (bRE) from the reset input 222. The PFET 504 thus disables the recharge circuit when the cell 202 is inhibited, while the PFET 506 recharges the photodiode 208 in response to a reset signal. As both the bEN and bRE signals must be active to connect the photodiode 208 cathode to the pull-up voltage source and hence recharge the photodiode 208, the PFETs 504, 506 can thus be viewed as performing a logical AND function. Following a reset, the bRE signal is deactivated and the cathode is left to float until the next reset/recharge cycle.

A PFET 512 and an N-channel field effect transistor (NFET) 514, the gates of which receive signals from the cathode of the photodiode 208, serve as an inverting photon trigger circuit. NFETs 516, 518 are connected in series between the photodiode 208 cathode and logic ground. The gate of NFET 518 receives the active low reset (bRE) signal, while the gate of the NFET 518 is connected to the output 520 of the trigger circuit. Thus, in the illustrated embodiment, the PETS 512, 514, 516, 518 form a relatively physically compact static latch that is set by a low going signal from the photodiode 208 cathode and reset via the reset (bRE) signal. Hence, the output 520 of the latching trigger circuit 308 may be considered to be a latched photon trigger signal.

NFETs 516, 518 also serve as an active quenching circuit that quenches the photodiode 208 following an avalanche. Note that the dimensions of the PFET 512 and NFET 514 are preferably selected so that the switching level of the inverter is relatively nearer the supply voltage than to logic ground. According to such an implementation, avalanches tend to be sensed and active quenching of the photodiode 208 commenced relatively quickly following a low going photodiode 208 signal. Afterpulsing also tends to be reduced.

NFET 510 is connected between the cathode of the photodiode 208 and logic ground, with its gate receiving the active low enable (bEN) signal from the status storage 302. Hence, the cathode is pulled to ground when the cell 202 is disabled. While the photodiode 208 remains reverse biased, the reverse bias voltage is less than the diode breakdown voltage. Note that, when the cell 202 is disabled, the output 520 of the trigger circuit is high.

NFETs 522 and 524 cooperate to produce the trigger output 212. As illustrated, the drain of NFET 522 is connected to the cell trigger output in an open drain configuration, and the gate of NFET 522 receives the signal 520 produced by the trigger circuit 308. NFET 524 is connected in series between the NFET 522 and logic ground. Its gate receives the active high enable (EN) signal from the inhibit storage 302. Hence, the cell trigger output 212 is pulled low in response a signal from the photodiode 208. NFET 522 disables the trigger output 212 if operation of the cell 202 is inhibited.

NFETs 526, 528, 530 cooperate to produce the selectively data output 214. NFETs 526, 528 function generally analogously to NFETs 522, 524. However, NFET 530 is connected in series between the drain of NFET 526 and the cell data output 214, with its gate connected to the active high output enable (OE) input. Hence, the data from the trigger circuit 308 is selectively provided to the data output 314.

Note that the illustrated configuration of the FETS 522, 524, 526, 528, 530 tends to reduce charge sharing between the data 214 and trigger 212 lines when the cell 202 is enabled. NFETs 526, 528 may be omitted and the source of NFET 530 connected directly the trigger output 520. While such a configuration reduces the component count of the cell 202, charge sharing between the data and trigger lines may be increased. In another variation, one of NFETs 524, 528 may be deleted and the sources of NFETS 522, 526 connected the drain of the remaining NFET.

Figure 6:
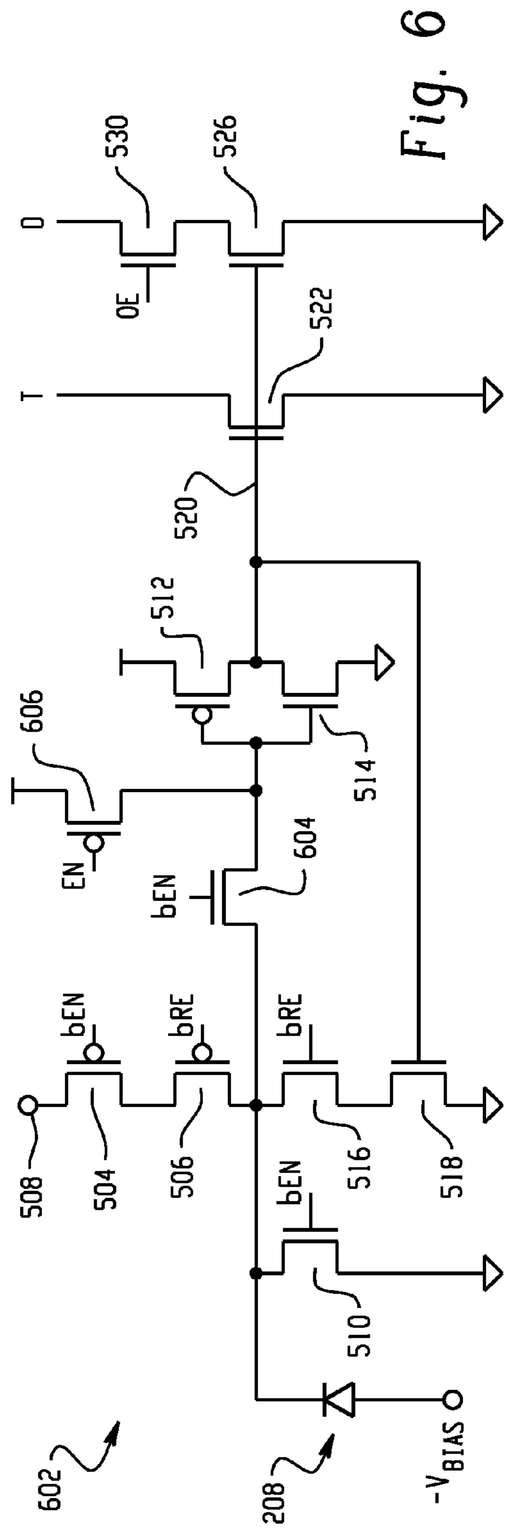

A second embodiment 602 of the cell readout circuit is illustrated in FIG. 6. Note that, relative to the embodiment of FIG. 5, NFETS 524, 528 have been omitted, while NFET 604 and PFET 606 have been added. NFET 604 is located electrically in series between the cathode of the photodiode 208 and the input of the trigger circuit 308. The gate of NFET 604 is connected to the bEN output of the storage 304.

The configuration of FIG. 6 causes the trigger output 520 to remain in the low state when the cell 202 is disabled. In contrast to the configuration of FIG. 5, such a configuration tends to reduce the capacitive loading of the trigger 212 and data 214 lines by the respective NFETS 522, 526, 530 when the cell 202 is inhibited.

Figures 7, 8:
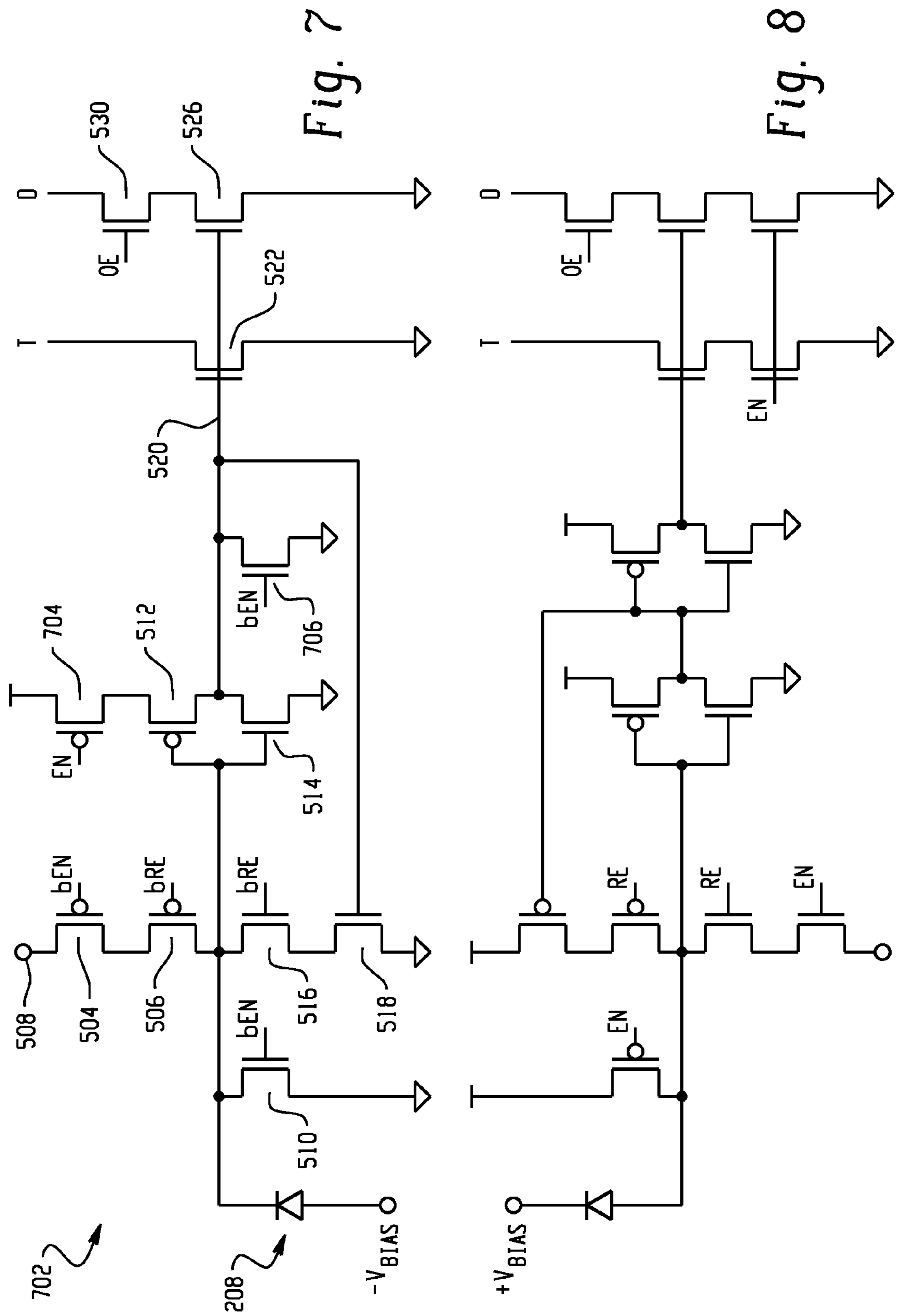

A third embodiment 702 of the cell readout circuit is illustrated in FIG. 7. Note that, relative to the embodiment of FIG. 6, NFET 604 and PFET 606 have been omitted, while PFET 704 and NFET 706 have been added. As will be appreciated, the illustrated configuration causes the output 520 of the trigger circuit to remain in the low state when the cell 202 is disabled. Relative to the embodiment of FIG. 6, the omission of the NFET 604 tends to improve slew rate of the trigger signal 602, thus tending to improve the slew rate of the cell trigger output and hence the accuracy of the photon timing measurement.

Note that, in the foregoing embodiments the readout circuitry 210 has been connected to the cathode of the photodiode 208. Embodiments in which the readout circuit 208 is connected to the anode of the photodiode are contemplated. In general, this can be accomplished by exchanging PFETs for NFETs and inverting the various control signals. As an NFET tends to be faster than a PFET of comparable size, however, the transistor that provides the trigger output signal (i.e., NFET 522) should remain an NFET. An anode-connected circuit analogous to that of FIG. 5 is depicted in FIG. 8. Those of ordinarily skill in the art will recognize that the embodiments of FIGS. 6 and 7 can be similarly modified.

Operation will now be described in relation to FIG. 9.

At 902, inhibit data is provided to the various cells 202 of the APD array 142, for example to disable an operation of those cells 202 that are prone to dark counts.

An examination is commenced at 904.

At 906, the various pixel(s) 142 produce pixel data indicative of photons or other radiation detected by the pixel during a desired measurement time.

As indicated at 908, the process is repeated until the examination is complete.

At 910, the pixel data is processed to generate image space or other suitable data indicative of the detected radiation.

At 912, the generated data is presented in a human perceptible form. Note that the processing and presentation steps may be performed during the examination.

Variations are contemplated. For example, other suitable readout circuits and imaging systems are also described in PCT publication WO 2006/111883A2 dated Oct. 26, 2006 and entitled Digital Silicon Photomultiplier for TOF-PET, U.S. provisional patent application Ser. No. 60/674,034 filed Apr. 22, 2005, and U.S. provisional patent application Ser. No. 60/682,226 filed May 18, 2005, each of which is expressly incorporated by reference in its entirety herein.

The functionality of the various cell readout circuits 202 and pixels 142 may also be modified as necessary to suit application-specific requirements. In applications where photon timing data is not required, for example, the trigger outputs 212 and TDC 216 may be omitted. Similarly, the test circuitry 226, the cell inhibit circuits 306, and/or the cell status storage 302 may be omitted, particularly in applications that are relatively insensitive to the performance of the various cells. As yet another example, the data outputs 214, the compressor 260, and the accumulator 262 may be omitted, especially in applications where a photon count is not required. In addition, the trigger 212 and/or data 214 outputs need not be configured as open drain outputs and may be configured as tri-state or other suitable outputs. The avalanche photodiodes may also be operated in other than the Geiger mode, and photosensors other than avalanche photodiodes may also be used.

It will also be understood that the term column has been illustrated in connection with vertical columns and the term row has been illustrated in connection with horizontal row for consistency of explanation, and that the cells 202 may be grouped in other than horizontal rows and vertical columns. Moreover, the cells 202 need not be grouped in rows and columns, and may be grouped and/or accessed in other suitable configurations or arrangements.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

What is claimed is:

1. An apparatus comprising:

a first photodetector cell including:

a first avalanche photodiode comprising an anode and a cathode, wherein when the first photodiode is not in a reset state a voltage on the cathode is floating, wherein the cathode of the first photodiode is directly connected to a first p-channel field effect transistor and the cathode of the first photodiode is directly connected to a n-channel field effect transistor, wherein a second p-channel field effect transistor is connected to a node of the first p-channel field effect transistor;

a first circuit that senses an avalanche of the first photodiode and stores a first 1-bit digital value indicative of the sensed avalanche;

a cell inhibit circuit including a six transistor static random access memory (SRAM) cell that enables an output of the stored first 1-bit digital value;

a second photodetector cell including:

a second avalanche photodiode;

a second circuit that senses an avalanche of the second photodiode and stores a second 1-bit digital value indicative of the sensed avalanche.

2. The apparatus of claim 1 including a counter that counts the 1-bit digital values of the first and second cells and produces a count value indicative of the number of sensed avalanches.

3. The apparatus of claim 2 wherein the counter includes a compressor and an accumulator.

4. The apparatus of claim 1 wherein the first photodetector cell includes the output, wherein the output presents a signal indicative of the sensed avalanche and the apparatus includes a time to digital converter having an input in operative electrical communication with the output.

5. The apparatus of claim 1 wherein the first photodetector cell includes a first input, a data output that presents the stored digital value, a photon trigger output that presents a photon trigger signal, and an inhibit circuit that inhibits, as a function of a signal received via the first input, the presentation of the photon trigger signal and the stored digital value.

6. The apparatus of claim 1 wherein the first photodetector cell includes a storage circuit that stores data indicative of an inhibit status of the cell and a data output that presents the stored digital value, and an inhibit circuit that inhibits, as a function of the stored data, the presentation of the stored digital value.

7. The apparatus of claim 1 wherein the first photodetector cell includes a first input and the second photodetector cell includes a second input, the first photodetector cell resets the digital value stored by the first circuit in response to a signal received via the first input, and the second photodetector cell resets the digital value stored by the second circuit in response to a signal received via the second input.

8. The apparatus of claim 1 wherein the first and second photodetector cells form part of a first detector pixel.

9. The apparatus of claim 1 wherein the first circuit includes a latch that latches, in response to the sensed avalanche, the digital value indicative of the avalanche.

10. The apparatus of claim 1, wherein during the reset state, a predetermined voltage is applied to the cathode.

11. A method comprising:

in a plurality of photodetector cells of a photodetector pixel:

determining if an avalanche photodiode of the cell produces a signal indicative of an avalanche, comprising an anode and a cathode, wherein when the photodiode is not in a reset state a voltage on the cathode is floating, wherein the cathode of the photodiode is directly connected to a p-channel field effect transistor and the cathode of the photodiode is directly connected to a n-channel field effect transistor, wherein a second p-channel field effect transistor is connected to a node of the first p-channel field effect transistor;

storing a result of the determination as a 1-bit digital value in a circuit of the cell, wherein an inhibit status value stored in a six transistor SRAM cell enables an output of the stored result;

counting the stored digital values to produce a value indicative of the number of avalanches.

12. The method of claim 11 wherein the cells are arranged in an array that includes a first row and a second row and counting includes:

counting the digital values stored in cells of the first row to produce a first count;

counting the digital values stored in cells of the second row to produce a second count;

adding the first and second counts.

13. The method of claim 11 including:

producing a signal indicative of a determined avalanche;

using the signal to trigger a time to digital conversion.

14. The method of claim 11 including:

producing a signal indicative of a determined avalanche;

using the signal to trigger a readout of the stored digital values.

15. The method of claim 11 including storing a digital signal received at an input of a first cell in a storage circuit of the first cell.

16. The method of claim 15 including using the stored digital signal to vary an operating mode of the first cell.

17. The method of claim 16 wherein using the stored digital signal to vary an operating mode includes disabling at least one of a photon data output and a photon trigger output of the first cell.

18. The method of claim 11 including resetting the 1-bit digital value stored in a first cell in response to a digital signal received at an input of the first cell.

19. The method of claim 18 including charging the photodiode of the first cell in response to the received digital signal.

20. The method of claim 11, wherein during the reset state, a predetermined voltage is applied to the cathode.

21. A photodetector comprising:

a semiconductor substrate;

a plurality of photodetector cells fabricated on the substrate, wherein the cells include:

an avalanche photodiode comprising an anode and a cathode, wherein when the photodiode is not in a reset state a voltage on the cathode is floating, wherein the cathode of the first photodiode is directly connected to a first field effect transistor and the cathode of the first photodiode is directly connected to a second field effect transistor, wherein a second p-channel field effect transistor is connected to a node of the first p-channel field effect transistor;

a six transistor SRAM cell that enables an output of an avalanche detected by the avalanche photodiode.

22. The photodetector of claim 21, wherein during the reset state, a predetermined voltage is applied to the cathode.

23. The photodetector of claim 21, wherein the first field effect transistor is a p-channel field effect transistor and the second field effect transistor is a n-channel field effect transistor.

* * * * *